United States Patent
Uehara et al.

(10) Patent No.: US 6,448,356 B1
(45) Date of Patent: Sep. 10, 2002

(54) ETHYLENE-α-OLEFIN COPOLYMER

(75) Inventors: Yumito Uehara; Yoshiyuki Ishihama; Yukitaka Goto, all of Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/931,755

(22) Filed: Aug. 20, 2001

Related U.S. Application Data

(63) Continuation of application No. 08/959,269, filed on Oct. 28, 1997, now abandoned.

(30) Foreign Application Priority Data

Oct. 31, 1996 (JP) .............................................. 8-290145

(51) Int. Cl.$^7$ ............................ C08F 210/16; C08F 4/64
(52) U.S. Cl. ...................... 526/348; 526/114; 526/116; 526/160; 526/127; 526/130; 526/348.3; 526/348.6; 526/943; 502/113; 502/120; 502/154
(58) Field of Search .............................. 526/348.6, 348, 526/348.3, 943, 160, 114, 116, 127, 130

(56) References Cited

U.S. PATENT DOCUMENTS 5,928,982 A    7/1999   Suga et al.

FOREIGN PATENT DOCUMENTS

| EP | 0 298 700 | 1/1989 |
|----|-----------|--------|
| EP | 0 339 571 | 11/1989 |
| EP | 0 452 920 | 10/1991 |
| EP | 0 511 665 | 11/1992 |
| EP | 0 569 249 | 11/1993 |
| EP | 0 598 628 | 5/1994 |
| EP | 0 640 627 | 3/1995 |
| EP | 0 658 576 | 6/1995 |
| EP | 0 668 296 | 8/1995 |
| EP | 0 683 180 | 11/1995 |
| EP | 0 735 059 | 10/1996 |
| EP | 0 763 550 | 3/1997 |
| EP | 0 769 523 | 4/1997 |
| EP | 0 781 789 | 7/1997 |

*Primary Examiner*—David W. Wu
*Assistant Examiner*—Caixia Lu
(74) *Attorney, Agent, or Firm*—Oblon, Spivak, McClelland, Maier & Neustadt, P.C.

(57) ABSTRACT

An ethylene-α-olefin copolymer which is a copolymer of ethylene with a $C_{3-20}$ α-olefin and which satisfies the following conditions (a) to (c):

(a) the density (D) is from 0.850 to 0.950 g/cm$^3$, (b) the relation between the melt tension (MT) and the melt flow rate (MFR) at 190° C. satisfies the following formula (1):

$$\log(MT) \geq -0.91 \times \log(MFR) + 0.06 \qquad (1),$$

and (c) the following three formulae (2), (3) and (4) are satisfied:

$$Tmax \leq 972D - 813 \qquad (2)$$

$$\log W_{60} \leq -0.114\ Tmax + 9.48 \qquad (3)$$

$$\log W_{90} \geq 0.0394\ Tmax - 2.95 \qquad (4)$$

where D is the density, Tmax is the elution peak temperature (°C.) by the cross fractionation measurement, $W_{60}$ is the weight percentage (wt %) of a soluble content at 60° C. or lower, and $W_{90}$ is the weight percentage (wt %) of a soluble content at 90° C. or higher.

3 Claims, No Drawings

ETHYLENE-α-OLEFIN COPOLYMER

This application is a Continuation of U.S. application Ser. No. 08/959,269, filed on Oct. 28, 1997, now abandoned.

The present invention relates to an ethylene-α-olefin copolymer. More particularly, the present invention relates to an ethylene-α-olefin copolymer, of which the MFR, the MT, the density and the elution behavior in cross fractionation satisfy certain specific relational formulae. When the copolymer of the present invention is molded into a film, it is excellent in the molding stability, and it is possible to obtain a film which is excellent in transparency, gloss and drape and free from stickiness.

A copolymer of ethylene with an α-olefin has been used in a large amount for various uses, particularly for bags, since a film obtained by blown-film extrusion of such a copolymer is excellent in mechanical properties such as tensile strength and impact strength. However, a film obtainable by blown-film extrusion of a copolymer of ethylene with an α-olefin alone has had a problem that the transparency is inadequate in many uses.

On the other hand, an ethylene-α-olefin copolymer produced by means of a metallocene catalyst has been proposed in recent years. The transparency of this copolymer is improved over the conventional ethylene-α-olefin copolymer but is still inadequate, and its molecular weight distribution is so narrow that the bubble stability during molding is not good (JP-A-4-213309).

Under the circumstances, there has been a proposal to improve the molding characteristic of polyethylene by broadening the molecular weight distribution by a method of carrying out polymerization in multisteps (JP-A-3-23717) or carrying out polymerization by using two or more metallocene compounds in combination (JP-A-5-155932 and JP-A-60-35006), or a proposal of a method wherein a polyethylene prepared by a high pressure method is mixed to an ethylene-α-olefin copolymer produced by means of a metallocene catalyst.

Further, International Patent Application WO93/08221 discloses a resin which is described to be excellent in the fluidity in spite of its narrow molecular weight distribution. However, even the resin disclosed in this application has had no adequate transparency, although it is better in fluidity and moldability to some extent than the former proposals.

Accordingly, it has been desired to develop an ethylene-α-olefin copolymer which, when formed into a film, provides adequate transparency without impairing excellent mechanical properties and processability specific to an ethylene-α-olefin copolymer.

The present inventors have conducted various studies to solve the above problems and as a result, have found that such problems can be solved by an ethylene-α-olefin copolymer, of which the melt tension and the melt flow rate have a certain specific relation, and which satisfies a certain specific elution condition. The present invention has been accomplished on the basis of this discovery.

That is, the present invention provides an ethylene-α-olefin copolymer which is a copolymer of ethylene with a $C_{3-20}$ α-olefin and which satisfies the following conditions (a) to (c):

(a) the density (D) is from 0.850 to 0.950 g/cm$^3$, (b) the relation between the melt tension (MT) and the melt flow rate (MFR) at 190° C. satisfies the following formula (1):

$$\log(MT) \geq -0.91 \times \log(MFR) + 0.06 \qquad (1),$$

and (c) the following three formulae (2), (3) and (4) are satisfied:

$$Tmax \leq 972D - 813 \qquad (2)$$

$$\log W_{60} \leq -0.114\ Tmax + 9.48 \qquad (3)$$

$$\log W_{90} \geq 0.0394\ Tmax - 2.95 \qquad (4)$$

where D is the density, Tmax is the elution peak temperature (°C.) by the cross fractionation measurement, $W_{60}$ is the weight percent (wt %) of a soluble copolymer content at 60° C. or lower, and $W_{90}$ is the weight ratio (wt %) of a soluble copolymer content at 90° C. or higher.

Preferred is the ethylene-α-olefin copolymer wherein said condition (c) is such that the following formulae are satisfied:

$$Tmax \leq 972D - 816 \qquad (2)'$$

$$\log W_{60} \leq -0.114\ Tmax + 9.48 \qquad (3)$$

$$\log W_{90} \geq 0.0394\ Tmax - 2.81 \qquad (4)'$$

Particularly preferred is the ethylene-α-olefin copolymer wherein the density (D) of said condition (a) is from 0.850 to 0.935 g/cm$^3$.

Now, the present invention will be described in detail with reference to the preferred embodiments.

The copolymer of the present invention has a density (D) of from 0.850 to 0.950 g/cm$^3$, preferably from 0.850 to 0.935 g/cm$^3$ (condition (a)). If the density is too low, the drape of the formed film product will be inadequate, and the processability by e.g. a bag-manufacturing machine will be poor, such being undesirable. On the other hand, if it is too high, no adequate transparency of the film will be secured.

Here, the density is one measured by a density gradient tube method after a strand obtained at the time of measuring the melt index is subjected to heat treatment at 100° C. for one hour and left to cool at room temperature for one hour.

Further, the copolymer of the present invention is required to satisfy a condition such that the relation between the melt tension (MT) and the melt flow rate (MFR) at 190° C. satisfies:

$$\log(MT) \geq -0.91 \times \log(MFR) + 0.06 \qquad (1)$$

preferably, $$\log(MT) \geq -0.91 \times \log(MFR) + 0.12$$

more preferably, $$\log(MT) \geq -0.91 \times \log(MFR) + 0.21$$

(condition (b)). If this relational formula is not satisfied, there will be a problem that during blown-film extrusion, the bubble is likely to be broken or swaying (the stability of the bubble can not be maintained).

It is particularly preferred that MFR of the copolymer is from 0.1 to 50 g/10 min. If MFR is too low, the fluidity at the time of melting tends to be inadequate, and the molded product tends to have surface roughness. On the other hand, if MFR is too high, the strength of the molded product tends to deteriorate, such being undesirable.

Here, MFR is one measured at 190° C. under a load of 2.16 kg in accordance with ASTMD 1238. The melt tension (MT) was measured by means of a capirograph manufactured by Kabushiki Kaisha Toyo Seiki Seisakusho under such conditions that the nozzle diameter was 2.095 mmφ, the nozzle length was 8 mm, the flow-in angle was 180°, the temperature was 190° C., the extrusion rate was 1.0 cm/min, the withdrawing rate was 4.0 m/min, and the distance from the die outlet to the lower end of the V-pully of the tension detector, was 40 cm.

A particularly important point in the present invention is that the copolymer has the specific copolymer composition distribution while having a narrow molecular weight distribution. Such a copolymer composition distribution is characterized in that the maximum peak temperature (Tmax) in the elution curve by cross fractionation shifts to a relatively low side depending upon the density of the copolymer, and the amount of soluble components in a high temperature region is relatively large depending upon Tmax. Namely, in the present invention, the density (D), the temperature (Tmax) at the maximum peak position, the soluble content weight percentage at 60° C. or lower ($W_{60}$) and the soluble content weight percentage at 90° C. or higher ($W_{90}$) are required to satisfy the following three formulae simultaneously, for example, in order to attain excellent film-molding stability during blown-film extrusion for excellent transparency of the resulting film (condition (c)):

$$\text{Tmax} \leq 972D-813 \tag{2}$$

$$\log W_{60} \leq -0.114 \text{ Tmax} + 9.48 \tag{3}$$

$$\log W_{90} \geq 0.0394 \text{ Tmax} - 2.95 \tag{4}$$

preferably, $$\text{Tmax} \leq 972D-816 \tag{2}'$$

$$\log W_{60} \leq -0.114 \text{ Tmax} + 9.48 \tag{3}'$$

$$\log W_{90} \geq 0.0394 \text{ Tmax} - 2.81 \tag{4}'$$

If the above formulae are not satisfied, the stability of the bubble can not be maintained when such a resin is formed into a film by blown-film extrusion, and the resulting film tends to be poor in the transparency (haze) and in the drape, and the film surface tends to be sticky.

Here, the measurement by cross fractionation was carried out by means of a cross fractionation column (CFC) manufactured by Mitsubishi Chemical Company Ltd. under such conditions that the solvent was o-dichlorobenzene, the column size was 0.46 mm in diameter×15 cm, the packing was glass beads (0.1 mm in diameter), the detector was an infrared detector (MIRAN 1A), the measuring wave number was 3.42 µm, the sample concentration was 3 mg/ml and the injected amount was 0.4 ml. Specifically, a sample solution was introduced into the column at 140° C. under the above conditions, cooled to 0° C. at a temperature lowering rate of 1° C./min and maintained for 30 minutes, and thereafter, it was eluted at each temperature of 26 divisions i.e. 0, 10, 20, 30, 35, 40, 45, 49, 52, 55, 58, 61, 64, 67, 70, 73, 76, 79, 82, 85, 88, 91, 94, 100, 120 and 140° C., and the polymer concentrations were detected by an infrared detector, whereupon an elution curve was obtained. In the second and subsequent divisions, the sample solution in the column was maintained for 40 minutes at each temperature and then eluted. The flow rate was 1 ml/min.

Thus, the ethylene-α-olefin copolymer of the present invention satisfies the above conditions (a) to (c). Further, in a case where a film excellent in transparency with a density exceeding 0.9 g/cm³, preferably from 0.900 to 0.934 g/cm, is desired, it is preferred that the copolymer satisfies the following condition (d) in addition to the above conditions (a) to (c):

(d) the film haze (%)≤1.5×10⁴(D−0.9)²+3 (5)

preferably, the film haze (%)≤1.5×10⁴(D−0.9)²+2
more preferably, the film haze (%)≤1.0×10⁴(D−0.9)²+2

Here, the film haze is measured by using a film having a thickness of 30 µm formed by blown-film extrusion under a condition of a blow-up ratio of 2.0. D is the density.

The above described copolymer of the present invention may be obtained by various methods, for example, a method wherein ethylene-α-olefin copolymers separately produced by means of so-called metallocene catalysts, are blended by kneading, a method wherein polymerization is carried out in a series of multisteps differing in the set density conditions, or a method wherein two types of metallocene compounds are used in combination to obtain copolymers having different densities. The method is not particularly limited so long as the above mentioned conditions (a) to (c), or (a) to (d), are satisfied. However, preferred is a copolymer obtained by polymerization by means of a catalyst comprising the following components (A) to (C):

(A) a metallocene-type transition metal compound
(B) an ion-exchanging layered compound or a non-layered inorganic silicate, and, if necessary,
(C) an organic aluminum compound.

The metallocene-type transition metal compound of component (A), is an organometallic compound or a cation-type complex thereof, composed of (i) one or two cyclopentadienyl-type ligands which may be substituted, or one or two cyclopentadienyl ring-containing ligands wherein substituents may bond to form a fused ring, and (ii) a transition metal of Group 3, 4, 5 or 6 of the long-form Periodic Table (the Periodic Table employing 18 Group system defined by IUPAC in 1989, and the same applies hereinafter).

Preferred as such a metallocene-type transition metal compound of component (A) is a compound of the following formula (1) or (2):

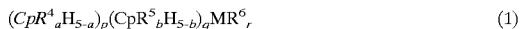

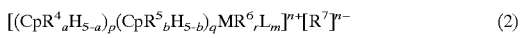

wherein $CpR^4{}_aH_{5-a}$ and $CpR^5{}_bH_{5-b}$ are a cyclopentadienyl (Cp) group derivative.

In the formula (1) or (2), each of $R^4$ and $R^5$ which may be the same or different, is a $C_{1-20}$ hydrocarbon group which may be substituted, a silicon-containing group, a phosphorus-containing group, a nitrogen-containing group or an oxygen-containing group.

Examples of $R^4$ and $R^5$ groups include an alkyl group such as methyl, ethyl, propyl, isopropyl, butyl, isobutyl, t-butyl, pentyl, isopentyl, hexyl, heptyl, octyl, nonyl or decyl; an aryl group such as phenyl, p-tolyl, o-tolyl or m-tolyl; a halo-substituted hydrocarbon group such as fluoromethyl, fluoroethyl, fluorophenyl, chloromethyl, chloroethyl, chlorophenyl, bromomethyl, bromoethyl, bromophenyl, iodomethyl, iodoethyl or iodophenyl; a silicon-containing substituent such as trimethylsilyl, triethylsilyl or triphenylsilyl; an alkoxy group such as methoxy, ethoxy, propoxy, isopropoxy, butoxy, isobutoxy or t-butoxy; and an aryloxy group such as phenoxy, methylphenoxy, pentamethylphenoxy, p-tolyloxy, m-tolyloxy or o-tolyloxy. Among them, preferred are a $C_{1-4}$ alkyl group such as methyl, ethyl, propyl, isopropyl, butyl, isobutyl or t-butyl; a silicon-containing substituent such as trimethylsilyl; an alkoxy group such as methoxy; and an aryloxy group such as phenoxy.

Further, $R^4$ and $R^5$ may bond each other to form a crosslinking group.

Specifically, it may be an alkylene group such as methylene or ethylene; an alkylidene group such as ethylidene, propylidene, isopropylidene, phenylmethylidene or diphenylmethylidene; a silicon-containing crosslinking group such as dimethylsilylene, diethylsilylene, dipropylsilylene, diisopropylsilylene, diphenylsilylene, methylethylsilylene, methylphenylsilylene, methylisopropylsilylene or methyl-t-butylsilylene; a germanium-containing crosslinking group such as dimethylgermilene, diethylgermilene, dipropylgermilene, diisopropylgermilene, diphenylgermilene, methylethylgermilene, methylphenylgermilene, methylisopropylgermilene or methyl-t-butylgermilene; an amino group; or a phosphinyl group.

Still further, $R^4$ and $R^4$, or $R^5$ and $R^5$ may respectively bond each other to form a ring. Preferable examples include an indenyl group, a tetrahydroindenyl group, a fluorenyl group and an octahydrofluorenyl group, which may be substituted.

Examples of a $R^6$ group include a $C_{1-20}$ hydrocarbon group which may be substituted, hydrogen, a halogen, a silicon-containing substituent, an alkoxy group, an aryloxy group, an amide group or a thioalkoxy group. Specific examples include an alkyl group such as methyl, ethyl, propyl, isopropyl, butyl, isobutyl, t-butyl, pentyl, isopentyl, hexyl, heptyl, octyl, nonyl or decyl; an aryl group such as phenyl, p-tolyl, o-tolyl or m-tolyl; a halo-substituted hydrocarbon group such as fluoromethyl, fluoroethyl, fluorophenyl, chloromethyl, chloroethyl, chlorophenyl, bromomethyl, bromoethyl, bromophenyl, iodomethyl, iodoethyl or iodophenyl; a halogen atom such as fluorine, chlorine, bromine or iodine; a silicon-containing substituent such as trimethylsilyl, triethylsilyl or triphenylsilyl; an alkoxy group such as methoxy, ethoxy, propoxy, isopropoxy, butoxy, isobutoxy or t-butoxy; an aryloxy group such as phenoxy, methylphenoxy, pentamethylphenoxy, p-tolyloxy, m-tolyloxy or o-tolyloxy; an amide group such as dimethylamide, diethylamide, dipropylamide, diisopropylamide, ethyl-t-butylamide or bis(trimethylsilyl) amide; and a thioalkoxy group such as methylthioalkoxy, ethylthioalkoxy, propylthioalkoxy, butylthioalkoxy, t-butylthioalkoxy or phenylthioalkoxy. Preferable examples include hydrogen, a methyl group, an ethyl group, a propyl group, an isopropyl group, a butyl group, a phenyl group, a halogen atom such as chlorine, a methoxy group, an ethoxy group, a propoxy group, an isopropoxy group, a dimethylamide group and a methylthioalkoxy group, and more preferable examples include hydrogen, a methyl group and chlorine.

Further, $R^6$ may bond with $R^4$, $R^5$ or Cp, and examples of such a ligand include $CpH_4(CH_2)_nO—$ ($1 \leq n \leq 5$), $CpMe_4(CH_2)_nO—$ ($1 \leq n \leq 5$), $CpH_4(Me_2Si)(t-Bu)N—$ and $Cp(Me_4)(Me_2Si)(t-Bu)N—$ (Cp is a cyclopentadienyl group, Me is a methyl group, and Bu is a butyl group).

Still further, $R^6$ may bond each other to form a didentate ligand, examples of which include $—OCH_2O—$, $—OCH_2CH_2O—$ and $—O(o-C_6H_4)O—$.

M is an atom of Group 3, 4, 5 or 6 of the long-form Periodic Table, examples of which include scandium, yttrium, lanthanum, cerium, praseodymium, neodymium, samarium, europium, gadolinium, terbium, dysprosium, holmium, erbium, thulium, ytterbium, lutetium, actinium, thorium, protactinium, uranium, titanium, zirconium, hafnium, vanadium, niobium, tantalum, chromium, molybdenum and tungsten. Preferable examples include Group 4 atoms such as titanium, zirconium and hafnium. They may be used in a mixture.

L is an electrically neutral ligand, and m is its number and is an integer of 0 or more. Examples include ethers such as diethyl ether, tetrahydrofuran or dioxane; nitriles such as acetonitrile; amides such as dimethylformamide; phosphines such as trimethylphosphine; and amines such as trimethylamine. Preferable examples include tetrahydrofuran, trimethylphosphine or trimethylamine.

$[R^7]^{n-}$ is one or more anions to neutralize a cation, and examples include tetraphenyl borate, tetra(p-tolyl)borate, carbadodeca borate, dicarbaundeca borate, tetrakis (pentafluorophenyl)borate, tetrafluoroborate, and hexafluorophosphate. Preferable examples include tetraphenyl borate, tetra(p-tolyl)borate, tetrafluoroborate and hexafluorophosphate. a and b are respectively integers of from 0 to 5. Also, p, q and r are 0 or positive integers which satisfy the equation, $p+q+r=V$ ($V$=the valence of M), in case that the metallocene-type transition metal compound is a compound of the formula (1), or p, q and r are 0 or positive integers which satisfy the equation, $p+q+r=V-n$, in case that the metallocene-type transition metal compound is a compound of the formula (2). Usually, p and q are integers of from 0 to 3, preferably 0 or 1, and r is an integer of from 0 to 3, preferably 1 or 2. n is an integer to satisfy $0 \leq n \leq V$.

The above described catalyst is capable of producing any one of an isotactic polymer, a syndiotactic polymer and an atactic polymer.

Taking zirconium as an example, specific examples of the above metallocene-type transition metal compound corresponding to the formula (1) include
bis(methylcyclopentadienyl)zirconium dichloride,
bis(ethylcyclopentadienyl)zirconium dichloride,
bis(methylcyclopentadienyl)zirconium dimethyl,
bis(ethylcyclopentadienyl)zirconium dimethyl,
bis(methylcyclopentadienyl)zirconium dihydride,
bis(ethylcyclopentadienyl)zirconium dihydride,
bis(dimethylcyclopentadienyl)zirconium dichloride,
bis(trimethylcyclopentadienyl)zirconium dichloride,
bis(tetramethylcyclopentadienyl)zirconium dichloride,
bis(ethyltetramethylcyclopentadienyl)zirconium dichloride,
    bis(ethyl-n-butylcyclopentadienyl)zirconium dichloride,
    bis(ethylmethylcyclopentadienyl)zirconium
dichloride, bis(n-butylmethylcyclopentadienyl)zirconium dichloride, bis(indenyl)zirconium dichloride,
bis(dimethylcyclopentadienyl)zirconium dimethyl,
bis(trimethylcyclopentadienyl)zirconium dimethyl,
bis(tetramethylcyclopentadienyl)zirconium dimethyl,
bis(ethyltetramethylcyclopentadienyl)zirconium dimethyl,
bis(indenyl)zirconium dimethyl,
bis(dimethylcyclopentadienyl)zirconium dihydride,
bis(trimethylcyclopentadienyl)zirconium dihydride,
bis(ethyltetramethylcyclopentadienyl)zirconium dihydride,
bis(trimethylsilylcyclopentadienyl)zirconium dimethyl,
bis(trimethylsilylcyclopentadienyl)zirconium dihydride,
bis(trifluoromethylcyclopentadienyl)zirconium dichloride,
bis(trifluoromethylcyclopentadienyl)zirconium dimethyl,
bis(trifluoromethylcyclopentadienyl)zirconium dihydride,
isopropylidenebis(indenyl)zirconium dichloride,
isopropylidenebis(indenyl)zirconium dimethyl,
isopropylidenebis(indenyl)zirconium dihydride,
pentamethylcyclopentadienyl(cyclopentadienyl)zirconium
    dichloride,
pentamethylcyclopentadienyl(cyclopentadienyl)zirconium
    dimethyl,
pentamethylcyclopentadienyl(cyclopentadienyl)zirconium
    dihydride,
ethyltetramethylcyclopentadienyl(cyclopentadienyl)
    zirconium dihydride,
isopropylidene(cyclopentadienyl)(fluorenyl)zirconium
    dichloride,
isopropylidene(cyclopentadienyl)(fluorenyl)zirconium
    dimethyl, dimethylsilyl(cyclopentadienyl)(fluorenyl)zirconium dimethyl,
isopropylidene(cyclopentadienyl)(fluorenyl)zirconium dihydride, bis(cyclopentadienyl)zirconium dichloride,
bis(cyclopentadienyl)zirconium dimethyl,
bis(cyclopentadienyl)zirconium diethyl,
bis(cyclopentadienyl)zirconium dipropyl,
bis(cyclopentadienyl)zirconium diphenyl,
methylcyclopentadienyl(cyclopentadienyl)zirconium dichloride,
ethylcyclopentadienyl(cyclopentadienyl)zirconium dichloride,
methylcyclopentadienyl(cyclopentadienyl)zirconium dimethyl,
ethylcyclopentadienyl(cyclopentadienyl)zirconium dimethyl,
methylcyclopentadienyl(cyclopentadienyl)zirconium dihydride,
ethylcyclopentadienyl(cyclopentadienyl)zirconium dihydride,
dimethylcyclopentadienyl(cyclopentadienyl)zirconium dichloride,
trimethylcyclopentadienyl(cyclopentadienyl)zirconium dichloride,
tetramethylcyclopentadienyl(cyclopentadienyl)zirconium dichloride, bis(pentamethylcyclopentadienyl)zirconium dichloride,
tetramethylcyclopentadienyl(cyclopentadienyl)zirconium dichloride, indenyl(cyclopentadienyl)zirconium dichloride,
dimethylcyclopentadienyl(cyclopentadienyl)zirconium dimethyl,
trimethylcyclopentadienyl(cyclopentadienyl)zirconium dimethyl,
tetramethylcyclopentadienyl(cyclopentadienyl)zirconium dimethyl, bis(pentamethylcyclopentadienyl)zirconium dimethyl,
ethyltetramethylcyclopentadienyl(cyclopentadienyl) zirconium dimethyl, indenyl(cyclopentadienyl)zirconium dimethyl,
dimethylcyclopentadienyl(cyclopentadienyl)zirconium dihydride,
trimethylcyclopentadienyl(cyclopentadienyl)zirconium dihydride, bis(pentamethylcyclopentadienyl)zirconium dihydride, indenyl(cyclopentadienyl)zirconium dihydride,
trimethylsilylcyclopentadienyl(cyclopentadienyl)zirconium dimethyl,
trimethylsilylcyclopentadienyl(cyclopentadienyl)zirconium dihydride,
trifluoromethylcyclopentadienyl(cyclopentadienyl) zirconium dichloride,
trifluoromethylcyclopentadienyl(cyclopentadienyl) zirconium dimethyl,
trifluoromethylcyclopentadienyl(cyclopentadienyl) zirconium dihydride,
bis(cyclopentadienyl)(trimethylsilyl)(methyl)zirconium,
bis(cyclopentadienyl)(triphenylsilyl)(methyl)zirconium,
bis(cyclopentadienyl)[tris(dimethylsilyl)silyl](methyl) zirconium,
bis(cyclopentadienyl)[(bis(methylsilyl)silyl](methyl) zirconium,
bis(cyclopentadienyl)(trimethylsilyl)(trimethylsilylmethyl) zirconium,
bis(cyclopentadienyl)(trimethylsilyl)(benzyl)zirconium,
methylenebis(cyclopentadienyl)zirconium dichloride,
ethylenebis(cyclopentadienyl)zirconium dichloride,
isopropylidenebis(cyclopentadienyl)zirconium dichloride,
dimethylsilylbis(cyclopentadienyl)zirconium dichloride,
methylenebis(cyclopentadienyl)zirconium dimethyl,
ethylenebis(cyclopentadienyl)zirconium dimethyl,
isopropylidenebis(cyclopentadienyl)zirconium dimethyl,
dimethylsilylbis(cyclopentadienyl)zirconium dimethyl,
methylenebis(cyclopentadienyl)zirconium dihydride,
ethylenebis(cyclopentadienyl)zirconium dihydride,
isopropylidenebis(cyclopentadienyl)zirconium dihydride,
dimethylsilylbis(cyclopentadienyl)zirconium dihydride,
bis(cyclopentadienyl)zirconiumbis(methanesulfonate),
bis(cyclopentadienyl)zirconiumbis(p-toluenesulfonate),
bis(cyclopentadienyl)zirconiumbis(trifluoromethanesulfonate),
bis(cyclopentadienyl)zirconiumtrifluoromethanesulfonate chloride,
bis(cyclopentadienyl)zirconiumbis(benzenesulfonate),
bis(cyclopentadienyl)zirconiumbis(pentafluorobenzenesulfonate),
bis(cyclopentadienyl)zirconiumbenzenesulfonate chloride,
bis(cyclopentadienyl)zirconium(ethoxy) trifluoromethanesulfonate, bis(tetramethylcyclopentadienyl)zirconiumbis(trifluoromethanesulfonate),
bis(indenyl)zirconiumbis(trifluoromethanesulfonate),
ethylenebis(indenyl)zirconiumbis(trifluoromethanesulfonate), isopropylidenebis(indenyl)zirconiumbis(trifluoromethanesulfonate),
(t-butylamide)dimethyl(tetramethylcyclopentadienyl) silanedibenzylzirconium, (t-butylamide)dimethyl(2,3,4,5-tetramethylcyclopentadienyl)silanedibenzylzirconium,
indenylzirconiumtris(dimethylamide),
indenylzirconiumtris(diethylamide),
indenylzirconiumtris(di-n-propylamide),
cyclopentadienylzirconiumtris(dimethylamide),
methylcyclopentadienylzirconiumtris(dimethylamide),
(t-butylamide)(tetramethylcyclopentadienyl)-1,2-ethanediylzirconium dichloride,
(methylamide)(tetramethylcyclopentadienyl)-1,2-ethanediylzirconium dichloride,
(ethylamide)(tetramethylcyclopentadienyl) methylenezirconium dichloride, (t-butylamide)dimethyl (tetramethylcyclopentadienyl)silanezirconium dichloride,
(benzylamide)dimethyl(tetramethylcyclopentadienyl) silanezirconium dichloride,
(phenylphosphide)dimethyl(tetramethylcyclopentadienyl) silanezirconium dibenzyl,
(phenylamide)dimethyl(tetramethylcyclopentadienyl) silanezirconium dichloride, (2-methoxyphenylamide) dimethyl(tetramethylcyclopentadienyl)silanezirconium dichloride,
(4-fluorophenylamide)dimethyl (tetramethylcyclopentadienyl)silanezirconium dichloride, and ((2,6-di(1-methylethyl)phenyl)amide)dimethyl (tetramethylcyclopentadienyl)amidezirconium dichloride.

Further, those corresponding to the formula (2) include a bis(methylcyclopentadienyl)zirconium(chloride) (tetraphenylborate)tetrahydrofuran complex, a bis (ethylcyclopentadienyl)zirconium(chloride) (tetraphenylborate)tetrahydrofuran complex, a bis (methylcyclopentadienyl)zirconium(methyl) (tetraphenylborate)tetrahydrofuran complex, a bis (ethylcyclopentadienyl)zirconium(methyl) (tetraphenylborate)tetrahydrofuran complex, a bis (methylcyclopentadienyl)zirconium(hydride) (tetraphenylborate)tetrahydrofuran complex, a bis (ethylcyclopentadienyl)zirconium(hydride)(tetraphenylborate)tetrahydrofuran complex, a bis(dimethylcyclopentadienyl)zirconium(chloride)(tetraphenylborate)tetrahydrofuran complex, a bis(trimethylcyclopentadienyl)zirconium(chloride)(tetraphenylborate)tetrahydrofuran complex, a bis(tetramethylcyclopentadienyl)zirconium(chloride)(tetraphenylborate)tetrahydrofuran complex, a bis(ethyltetramethylcyclopentadienyl)zirconium(chloride)(tetraphenylborate)tetrahydrofuran complex, a bis(indenyl)zirconium(chloride)(tetraphenylborate)tetrahydrofuran complex, a bis(dimethylcyclopentadienyl)zirconium(methyl)(tetraphenylborate)tetrahydrofuran complex, a bis(trimethylcyclopentadienyl)zirconium(methyl)(tetraphenylborate)tetrahydrofuran complex, a bis(tetramethylcyclopentadienyl)zirconium(methyl)(tetraphenylborate)tetrahydrofuran complex, a bis(ethyltetramethylcyclopentadienyl)zirconium(methyl)(tetraphenylborate)tetrahydrofuran complex, a bis(indenyl)zirconium(methyl)(tetraphenylborate)tetrahydrofuran complex, a bis(dimethylcyclopentadienyl)zirconium(hydride)(tetraphenylborate)tetrahydrofuran complex, a bis(trimethylcyclopentadienyl)zirconium(hydride)(tetraphenylborate)tetrahydrofuran complex, a bis(ethyltetramethylcyclopentadienyl)zirconium(hydride)(tetraphenylborate)tetrahydrofuran complex, a bis(trimethylsilylcyclopentadienyl)zirconium(methyl)(tetraphenylborate)tetrahydrofuran complex, a bis(trimethylsilylcyclopentadienyl)zirconium(hydride)(tetraphenylborate)tetrahydrofuran complex, a bis(trifluoromethylcyclopentadienyl)zirconium(methyl)(tetraphenylborate)tetrahydrofuran complex, a bis(trifluoromethylcyclopentadienyl)zirconium(hydride)(tetraphenylborate)tetrahydrofuran complex, an isopropylidenebis(indenyl)zirconium(chloride)(tetraphenylborate)tetrahydrofuran complex, an isopropylidenebis(indenyl)zirconium(methyl)(tetraphenylborate)tetrahydrofuran complex, an isopropylidenebis(indenyl)zirconium(hydride)(tetraphenylborate)tetrahydrofuran complex, a pentamethylcyclopentadienyl(cyclopentadienyl)zirconium(chloride)(tetraphenylborate)tetrahydrofuran complex, an ethyltetramethylcyclopentadienyl(cyclopentadienyl)zirconium(chloride)(tetraphenylborate)tetrahydrofuran complex, a pentamethylcyclopentadienyl(cyclopentadienyl)zirconium(methyl)(tetraphenylborate)tetrahydrofuran complex, an ethyltetramethylcyclopentadienyl(cyclopentadienyl)zirconium(methyl)(tetraphenylborate)tetrahydrofuran complex, a pentamethylcyclopentadienyl(cyclopentadienyl)zirconium(hydride)(tetraphenylborate)tetrahydrofuran complex, an ethyltetramethylcyclopentadienyl(cyclopentadienyl)zirconium(hydride)(tetraphenylborate)tetrahydrofuran complex, an isopropylidene(cyclopentadienyl)(fluorenyl)zirconium(chloride)(tetraphenylborate)tetrahydrofuran complex, an isopropylidene(cyclopentadienyl)(fluorenyl)zirconium(methyl)(tetraphenylborate)tetrahydrofuran complex, an isopropylidene(cyclopentadienyl)(fluorenyl)zirconium(hydride)(tetraphenylborate)tetrahydrofuran complex, a bis(cyclopentadienyl)zirconium(chloride)(tetraphenylborate)tetrahydrofuran complex, a bis(cyclopentadienyl)(methyl)zirconium(tetraphenylborate)tetrahydrofuran complex, a bis(cyclopentadienyl)(ethyl)zirconium(tetraphenylborate)tetrahydrofuran complex, a bis(cyclopentadienyl)(propyl)zirconium(tetraphenylborate)tetrahydrofuran complex, a bis(cyclopentadienyl)(phenyl)zirconium(tetraphenylborate)tetrahydrofuran complex, a methylcyclopentadienyl(cyclopentadienyl)zirconium(chloride)(tetraphenylborate)tetrahydrofuran complex, an ethylcyclopentadienyl(cyclopentadienyl)zirconium(chloride)(tetraphenylborate)tetrahydrofuran complex, a bis(ethylcyclopentadienyl)zirconium(chloride)(tetraphenylborate)tetrahydrofuran complex, a methylcyclopentadienyl(cyclopentadienyl)zirconium(methyl)(tetraphenylborate)tetrahydrofuran complex, an ethylcyclopentadienyl(cyclopentadienyl)zirconium(methyl)(tetraphenylborate)tetrahydrofuran complex, a methylcyclopentadienyl(cyclopentadienyl)zirconium(hydride)(tetraphenylborate)tetrahydrofuran complex, an ethylcyclopentadienyl(cyclopentadienyl)zirconium(hydride)(tetraphenylborate)tetrahydrofuran complex, a dimethylcyclopentadienyl(cyclopentadienyl)zirconium(chloride)(tetraphenylborate)tetrahydrofuran complex, a trimethylcyclopentadienyl(cyclopentadienyl)zirconium(chloride)(tetraphenylborate)tetrahydrofuran complex, a tetramethylcyclopentadienyl(cyclopentadienyl)zirconium(chloride)(tetraphenylborate)tetrahydrofuran complex, a bis(pentamethylcyclopentadienyl)zirconium(chloride)(tetraphenylborate)tetrahydrofuran complex, an indenyl(cyclopentadienyl)zirconium(chloride)(tetraphenylborate)tetrahydrofuran complex, a dimethylcyclopentadienyl(cyclopentadienyl)zirconium(methyl)(tetraphenylborate)tetrahydrofuran complex, a trimethylcyclopentadienyl(cyclopentadienyl)zirconium(methyl)(tetraphenylborate)tetrahydrofuran complex, a tetramethylcyclopentadienyl(cyclopentadienyl)zirconium(methyl)(tetraphenylborate)tetrahydrofuran complex, a bis(pentamethylcyclopentadienyl)zirconium(methyl)(tetraphenylborate)tetrahydrofuran complex, a cyclopentadienyl(indenyl)zirconium(methyl)(tetraphenylborate)tetrahydrofuran complex, a dimethylcyclopentadienyl(cyclopentadienyl)zirconium(hydride)(tetraphenylborate)tetrahydrofuran complex, a trimethylcyclopentadienyl(cyclopentadienyl)zirconium(hydride)(tetraphenylborate)tetrahydrofuran complex, a bis(pentamethylcyclopentadienyl)zirconium(hydride)(tetraphenylborate)tetrahydrofuran complex, an indenyl(cyclopentadienyl)zirconium(hydride)(tetraphenylborate)tetrahydrofuran complex, a trimethylsilylcyclopentadienyl(cyclopentadienyl)zirconium(methyl)(tetraphenylborate)tetrahydrofuran complex, a trimethylsilylcyclopentadienyl(cyclopentadienyl)zirconium(hydride)(tetraphenylborate)tetrahydrofuran complex, a trifluoromethylcyclopentadienyl(cyclopentadienyl)zirconium(hydride)(tetraphenylborate)tetrahydrofuran complex, a bis(cyclopentadienyl)(trimethylsilyl)zirconium(tetraphenylborate)tetrahydrofuran complex, a bis(cyclopentadienyl)(triphenylsilyl)zirconium(tetraphenylborate)tetrahydrofuran complex, a bis(cyclopentadienyl)[tris(trimethylsilyl)silyl]zirconium(tetraphenylborate)tetrahydrofuran complex, a bis(cyclopentadienyl)(trimethylsilylmethyl)zirconium(tetraphenylborate)tetrahydrofuran complex, a bis(cyclopentadienyl)(benzyl)zirconium(tetraphenylborate)tetrahydrofuran complex, a methylenebis(cyclopentadienyl)zirconium(chloride)(tetraphenylborate)tetrahydrofuran complex, an ethylenebis(cyclopentadienyl)zirconium(chloride)(tetraphenylborate)tetrahydrofuran complex, an isopropylidenebis(cyclopentadienyl)zirconium(chloride)(tetraphenylborate)tetrahydrofuran complex, a dimethylsilylbis(cyclopentadienyl)zirconium(chloride)(tetraphenylborate)tetrahydrofuran complex, a methylenebis(cyclopentadienyl)zirconium(methyl)(tetraphenylborate)tetrahydrofuran complex, an ethylenebis(cyclopentadienyl)zirconium(methyl)(tetraphenylborate)tetrahydrofuran complex, an isopropylidenebis(cyclopentadienyl)zirconium (methyl)(tetraphenylborate)tetrahydrofuran complex, a dimethylsilylbis(cyclopentadienyl)zirconium(methyl) (tetraphenylborate)tetrahydrofuran complex, a methylenebis (cyclopentadienyl)zirconium(hydride)(tetraphenylborate) tetrahydrofuran complex, an ethylenebis(cyclopentadienyl) zirconium(hydride)(tetraphenylborate)tetrahydrofuran complex, an isopropylidenebis(cyclopentadienyl)zirconium (hydride)(tetraphenylborate)tetrahydrofuran complex, a dimethylsilylbis(cyclopentadienyl)zirconium(hydride) (tetraphenylborate)tetrahydrofuran complex, a bis (cyclopentadienyl)zirconium(methanesulfonate) (tetraphenylborate)tetrahydrofuran complex, a bis (cyclopentadienyl)zirconium(p-toluenesulfonate) (tetraphenylborate)tetrahydrofuran complex, a bis (cyclopentadienyl)zirconium(trifluoromethanesulfonate) (tetraphenylborate)tetrahydrofuran complex, a bis (cyclopentadienyl)zirconium(benzenesulfonate) (tetraphenylborate)tetrahydrofuran complex, a bis (cyclopentadienyl)zirconium(pentafluorobenzenesulfonate) (tetraphenylborate)tetrahydrofuran complex, a bis (tetramethylcyclopentadienyl)zirconium (trifluoromethanesulfonate)(tetraphenylborate) tetrahydrofuran complex, a bis(indenyl)zirconium (trifluoromethanesulfonate)(tetraphenylborate) tetrahydrofuran complex, an ethylenebis(indenyl)zirconium (trifluoromethanesulfonate)(tetraphenylborate) tetrahydrofuran complex, and an isopropylidenebis(indenyl) zirconium(trifluoromethanesulfonate)(tetraphenylborate) tetrahydrofuran complex.

In the above examples, a di-substituted cyclopentadienyl ring includes 1,2- and 1,3-substituted rings, and a tri-substituted cyclopentadienyl ring includes 1,2,3- and 1,2,4-substituted rings.

Further, with respect to compounds of other metals of Groups 3, 4, 5 and 6, such as titanium compounds and hafnium compounds, those equivalents to the above compounds may be mentioned. Further, a mixture of such compounds may also be employed.

As the above component (B), (1) an ion exchanging layered compound or (2) an inorganic silicate having no layered structure i.e. a non-layered inorganic silicate, is used.

The ion exchanging layered compound is a compound having a crystal structure in which faces constituted by e.g. ionic bonds are piled in parallel to one another by a weak bonding force, and the contained ions are exchangeable. The majority of clays are ion-exchanging layered compounds. Clays are generally composed of clay minerals as the main component. These clays, clay minerals and ion-exchanging layered compounds may not only be natural products but also be artificially synthesized products.

Examples of clays and clay minerals include an allophane group such as allophane, a kaolin group such as dickite, nacrite, kaolinite or anauxite, a halloysite group such as metahalloysite or halloysite, a serpentine group such as chrysotile or antigorite, a smectite group such as montmorillonite, beidellite, nontronite, saponite or hectorite, a vermiculite mineral such as vermiculite, a mica mineral such as illite, sericite or glauconite, attapulgite, sepiolite, palygorskite, bentonite, Kibushi clay, gairome clay, hisingerite, pyrophyllite, chlorite, and other groups. The ion-exchanging layered compound used in the present invention may be a mixture of these minerals. Among these, particularly preferred is a smectite group such as montmorillonite, beidellite, nontronite, saponite, hectorite, bentonite, teniorite or mica.

Further, examples of ion-exchanging layered compounds include ion-crystalline compounds having a layered crystal structure of e.g. hexagonal most densely packed type, antimony type, $CdCl_2$ type or $CdI_2$ type. Specific examples of ion-exchanging layered compounds having such a crystal structure include crystalline acidic salts of polyvalent metals such as $\alpha$-$Zr(HAsO_4)_2 \cdot H_2O$, $\alpha$-$Zr(HPO_4)_2$, $\alpha$-$Zr(KPO_4)_2 \cdot 3H_2O$, $\alpha$-$Ti(HPO_4)_2$, $\alpha$-$Ti(HAsO_4)_2 \cdot H_2O$, $\alpha$-$Sn(HPO_4)_2 \cdot H_2O$, $\gamma$-$Zr(HPO_4)_2$, $\gamma$-$Ti(HPO_4)_2$ and $\gamma$-$Ti(NH_4PO_4)_2 \cdot H_2O$.

Examples of the non-layered inorganic silicate include zeolite and diatomaceous earth.

Further, it is preferred that component (B) is subjected to chemical treatment. Here, the chemical treatment may be surface treatment for removing impurities attached on the surface, or treatment which gives an influence to the crystal structure. Specifically, acid-treatment, alkali-treatment, salt-treatment and organic substance-treatment may, for example, be mentioned. By the acid-treatment, not only impurities on the surface will be removed, but also the surface area will be increased, as cations such as Al, Fe and Mg in the crystal structure will be eluted. By the alkali-treatment, the crystal structure of clay will be destroyed, thus bringing about a change in the structure of clay. By the salt-treatment and the organic substance-treatment, it is possible to change the surface area or the interlaminar distance by forming an ionic complex, a molecular complex or an organic derivative. Further, by replacing interlaminar exchangeable ions by another bulky ions by utilizing ion exchangeability, it is possible to obtain a layered substance having an enlarged interlaminar distance. Namely, bulky ions play a role of supporting the layered structure, and they are called pillars. Further, to introduce a separate substance between the layers of a layered substance is called intercalation. The guest compound for intercalation may, for example, be a cationic inorganic compound such as $TiCl_4$ or $ZrCl_4$, a metal alcoholate such as $Ti(OR)_4$, $Zr(OR)_4$, $PO(OR)_3$ or $B(OR)_3$ wherein R is alkyl or aryl, or a metal hydroxide ion such as $[Al_{13}O_4(OH)_{24}]^{7+}$, $[Zr_4(OH)_{14}]^{2+}$ or $[Fe_3O(OCOCH_3)_5]^+$. These compounds may be employed alone or in combination as a mixture of two or more of them. For intercalation of such a compound, a polymer obtained by hydrolyzing e.g. a metal alcoholate such as $Si(OR)_4$, $Al(OR)_4$ or $Ge(OR)_4$, or a colloidal inorganic compound such as $SiO_2$, may be present. Further, the pillar may, for example, be an oxide formed by heating for dehydration after intercalation of the above mentioned hydroxide ions between layers.

Component (B) may be a single compound, or a mixture of two or more of the above mentioned solid materials. Further, component (B) may have a wide rage of the average particle size. However, in the case of gas phase polymerization or slurry polymerization, it is preferred to employ spherical particles having an average particle size of at least 5 μm. It is more preferred to employ spherical particles having an average particle size of at least 10 μm. It is most preferred to employ spherical particles having an average particle size of from 10 to 100 μm. Here, the average particle size is the one obtained by measurement in ethanol by means of a laser micronizer LMS-24, manufactured by SEISHIN K. K. Further, as component (B), a natural product or a commercial product may be used as it is, if it is in the form of particles. Otherwise, the shape of particles may be made, for example, in a spherical form, and the particle size may be controlled by granulation, grading or fractionation.

Here, the granulation method may, for example, be agitation granulation, spray granulation, tumbling granulation, briquetting, compacting, extrusion granulation, fluidized bed granulation, emulsion granulation, submerged granulation or compression granulation. However, the granulation method is not particularly limited so long as it is capable of granulating component (B). As a preferred granulation method, agitation granulation, spray granulation, tumbling granulation or fluidized bed granulation may be mentioned. Particularly preferred is agitation granulation or spray granulation. To carry out the spray granulation, water or an organic solvent such as methanol, ethanol, chloroform, methylene chloride, pentane, hexane, heptane, toluene or xylene, may be used as a dispersing medium for the starting material slurry. It is preferred to employ water as the dispersing medium. The concentration of component (B) in the starting material slurry for spray granulation to obtain spherical particles, is usually from 0.1 to 70%, preferably from 1 to 50%, more preferably from 5 to 30%. The inlet temperature of hot air for spray granulation to obtain spherical particles varies depending upon the dispersing medium. When water is used as the dispersing medium, the inlet temperature is usually from 80 to 260° C., preferably from 100 to 220° C.

Further, at the time of granulation, an organic substance, an inorganic salt or a binder may be employed. The useful binder may, for example, be sugar, dextlose, corn syrup, gelatin, a glue, a carboxymethyl cellulose, a polyvinyl alcohol, water glass, magnesium chloride, aluminum sulfate, aluminum chloride, magnesium sulfate, an alcohol, glycol, starch, casein, latex, polyethylene glycol, polyethylene oxide, tar, pitch, alumina sol, silica gel, gum Arabic, or sodium alginate.

Preferred as component (B) is at least one compound selected from the group consisting of (1) ion exchanging layered compounds or (2) non-layered inorganic silicates, having a water content of at most 3 wt %, which is obtained by salt-treatment and/or acid-treatment. Such a compound can be obtained by subjecting at least one compound selected from the group consisting of ion exchanging layered compounds or non-layered inorganic silicates, to salt-treatment and/or acid-treatment. By the salt-treatment and/or the acid-treatment, it is possible to change the acidity of the solid, as described above.

Further, it is preferred that at least 40%, preferably at least 60%, of exchangeable Group 1 metal cations contained in said at least one compound selected from the group consisting of ion exchanging layered compounds or non-layered inorganic silicates, prior to salt-treatment, are ion-exchanged by cations dissociated from the flowing salts.

Examples of the salts used in the salt-treatment to conduct the above ion-exchanging, include a compound containing a cation of at least one atom selected from the group consisting of Groups 2 to 14 atoms of the long-form Periodic Table, preferably a compound comprising a cation of at least one atom selected from the group consisting of Groups 2 to 14 atoms and an anion of at least one member selected from a halogen atom, an inorganic acid and an organic acid, more preferably a compound comprising a cation of at least one atom selected from the group consisting of Groups 4 to 6 atoms and an anion of at least one member selected from the group consisting of Cl, Br, I, F, $PO_4$, $SO_4$, $NO_3$, $CO_3$, $C_2O_4$, $ClO_4$, $OOCCH_3$, $CH_3COCHCOCH_3$, $OCl_2$, $O(NO_3)_2$, $O(ClO_4)_2$, $O(SO_4)$, OH, $O_2Cl_2$, $OCl_3$, OOCH, $OOCCH_2CH_3$, $C_2H_4O_4$ and $C_6H_5O_7$.

More specific examples of the salts include $CaCl_2$, $CaSO_4$, $CaC_2O_4$, $Ca(NO_3)_2$, $Ca_3(C_6H_5O_7)_2$, $MgCl_2$, $MgBr_2$, $MgSO_4$, $Mg(PO_4)_2$, $Mg(ClO_4)_2$, $MgC_2O_4$, $Mg(NO_3)_2$, $Mg(OOCCH_3)_2$, $MgC_4H_4O_4$, $Sc(OOCCH_3)_2$, $Sc_2(CO_3)_3$, $Sc_2(C_2O_4)_3$, $Sc(NO_3)_3$, $Sc_2(SO_4)_3$, $ScF_3$, $ScCl_3$, $ScBr_3$, $ScI_3$, $Y(OOCCH_3)_3$, $Y(CH_3COCHCOCH_3)_3$, $Y_2(CO_3)_3$, $Y_2(C_2O_4)_3$, $Y(NO_3)_3$, $Y(ClO_4)_3$, $YPO_4$, $Y_2(SO_4)_3$, $YF_3$, $YCl_3$, $La(OOCCH_3)_3$, $La(CH_3COCHCOCH_3)_3$, $La_2(CO_3)_3$, $La(NO_3)_3$, $La(ClO_4)_3$, $La_2(C_2O_4)_3$, $LaPO_4$, $La_2(SO_4)_3$, $LaF_3$, $LaCl_3$, $LaBr_3$, $LaI_3$, $Sm(OOCCH_3)_3$, $Sm(CH_3COCHCOCH_3)_3$, $Sm_2(CO_3)_3$, $Sm(NO_3)_3$, $Sm(ClO_4)_3$, $Sm_2(C_2O_4)_3$, $Sm_2(SO_4)_3$, $SmF_3$, $SmCl_3$, $SmI_3$, $YP(OOCCH_3)_3$, $Yb(NO_3)_3$, $Yb$, $(ClO_4)_3$, $Yb(C_2O_4)_3$, $Yb_2(SO_4)_3$, $YbF_3$, $YbCl_3$, $Ti(OOCCH_3)_4$, $Ti(CO_3)_2$, $Ti(NO_3)_4$, $Ti(SO_4)_2$, $TiF_4$, $TiCl_4$, $TiBr_4$, $TiI_4$, $Zr(OOCCH_3)_4$, $Zr(CH_3COCHCOCH_3)_4$, $Zr(CO_3)_2$, $Zr(NO_3)_4$, $Zr(SO_4)_2$, $ZrF_4$, $ZrCl_4$, $ZrBr_4$, $ZrI_4$, $ZrOCl_2$, $ZrO(NO_3)_2$, $ZrO(ClO_4)_2$, $ZrO(SO_4)$, $Hf(OOCCH_3)_4$, $Hf(CO_3)_2$, $Hf(NO_3)_4$, $Hf(SO_4)_2$, $HfOCl_2$, $HfF_4$, $HfCl_4$, $HfBr_4$, $HfI_4$, $V(CH_3COCHCOCH_3)_3$, $VOSO_4$, $VOCl_3$, $VCl_3$, $VCl_4$, $VBr_3$, $Nb(CH_3COCHCOCH_3)_5$, $Nb_2(CO_3)_5$, $Nb(NO_3)_5$, $Nb_2(SO_4)_5$, $NbF_5$, $NbCl_5$, $NbBr_5$, $NbI_5$, $Ta(OOCCH_3)_5$, $Ta_2(CO_3)_5$, $Ta(NO_3)_5$, $Ta_2(SO_4)_5$, $TaF_5$, $TaCl_5$, $TaBr_5$, $TaI_5$, $Cr(CH_3COCHCOCH_3)_3$, $Cr(OOCH)_2OH$, $Cr(NO_3)_3$, $Cr(ClO_4)_3$, $CrPO_4$, $Cr_2(SO_4)_3$, $CrO_2Cl_2$, $CrF_3$, $CrCl_3$, $CrBr_3$, $CrI_3$, $MoOCl_4$, $MoCl_3$, $MoCl_4$, $MoCl_5$, $MoF_6$, $MoI_2$, $WCl_4$, $WCl_6$, $WF_6$, $WBr_5$, $Mn(OOCCH_3)_2$, $Mn(CH_3COCHCOCH_3)_2$, $MnCO_3$, $Mn(NO_3)_2$, $MnO$, $Mn(ClO_4)_2$, $MnF_2$, $MnCl_2$, $MnBr_2$, $MnI_2$, $Fe(OOCCH_3)_2$, $Fe(CH_3COCHCOCH_3)_3$, $FeCO_3$, $Fe(NO_3)_3$, $Fe(ClO_4)_3$, $FePO_4$, $FeSO_4$, $Fe_2(SO_4)_3$, $FeF_3$, $FeCl_3$, $FeBr_3$, $FeI_2$, $FeC_6H_5O_7$, $Co(OOCCH_3)_2$, $Co(CH_3COCHCOCH_3)_3$, $CoCO_3$, $Co(NO_3)_2$, $CoC_2O_4$, $Co(ClO_4)_2$, $CO_3(PO_4)_2$, $CoSO_4$, $CoF_2$, $CoCl_2$, $CoBr_2$, $CoI_2$, $NiCO_3$, $Ni(NO_3)_2$, $NiC_2O_4$, $Ni(ClO_4)_2$, $NiSO_4$, $NiCl_2$, $NiBr_2$, $Pd(OOCCH_3)_2$, $Pd(NO_3)_2$, $PdSO_4$, $PdCl_2$, $PdBr_2$, $CuCl_2$, $CuBr_2$, $Cu(NO_3)_2$, $CuC_2O_4$, $Cu(ClO_4)_2$, $CuSO_4$, $Cu(OOCCH_3)_2$, $Zn(OOCCH_3)_2$, $Zn(CH_3COCHCOCH_3)_2$, $Zn(OOCH)_2$, $ZnCO_3$, $Zn(NO_3)_2$, $Zn(ClO_4)_2$, $Zn_3(PO_4)_2$, $Zn(SO_4)$, $ZnF_2$, $ZnCl_2$, $ZnBr_2$, $ZnI_2$, $Cd(OOCCH_3)_2$, $Cd(CH_3COCHCOCH_3)_2$, $Cd(OOCCH_2CH_3)_2$, $Cd(NO_3)_2$, $Cd(ClO_4)_2$, $Cd(SO_4)$, $CdF_2$, $CdCl_2$, $CdBr_2$, $CdI_2$, $AlCl_3$, $AlI_3$, $AlBr_3$, $AlF_3$, $Al_2(SO_4)_3$, $AlPO_4$, $Al_2(C_2O_4)_3$, $Al(NO_3)_3$, $Al(CH_3COCHCOCH)_3)_3$, $GeCl_4$, $GeBr_4$, $GeI_4$, $Sn(OOCCH_3)_4$, $Sn(SO_4)_2$, $SnF_4$, $SnCl_4$, $SnBr_4$, $SnI_4$, $Pb(OOCCH_3)_4$, $PbCO_3$, $PbHPO_4$, $Pb(NO_3)_2$, $Pb(ClO_4)_2$, $PbSO_4$, $PbF_2$, $PbCl_2$, $PbBr_2$ and $PbI_2$.

The acid to be used for the acid-treatment is preferably selected from hydrochloric acid, sulfuric acid, nitric acid, acetic acid and oxalic acid. Two or more salts and acids may be used for the salt and acid treatments, respectively. When the salt-treatment and the acid-treatment are conducted in combination, the salt-treatment may be conducted before or after the acid-treatment, or at the same time as the acid-treatment.

The treating conditions with the salts and the acids are not specially limited, but they are appropriately selected among the conditions of a salt or acid concentration of from 0.1 to 30% by weight, a treating temperature of from room temperature to a boiling point and a treating time of from 5 minutes to 24 hours, so as to elute at least a part of the material constituting at least one compound selected from the group consisting of ion-exchanging layered compounds and non-layered inorganic silicates. The salts and the acids are used generally in aqueous solutions.

Particle shapes may be controlled by pulverization or granulation before, during or after the above salt-treatment and/or acid-treatment. Further, chemical treatment such as alkali-treatment or organic substance-treatment may be conducted in combination. The component (B) thus obtained preferably has a pore volume of pores (having a radius of at least 20 Å) of at least 0.1 cc/g, more preferably of from 0.3 to 5 cc/g, as measured by a mercury injection method.

At least one compound selected from the group consisting of such ion-exchanging layered compounds and inorganic silicates usually contains adsorbed water and interlaminar water. It is preferred to remove these adsorbed water and interlaminar water by heat treatment so that the water content of the compound will preferably be not higher than 3% by weight.

Here, the "adsorbed water" is water adsorbed on the surface or broken crystal face of particles of the ion-exchanging layered compound or the non-layered inorganic silicate, and the "interlaminar water" is water present between layers of crystal. The method for heat-treatment to remove the adsorbed water and interlaminar water from the ion-exchanging layered compound or the non-layered silicate is not particularly limited, and various methods such as heat-dehydration, heat-dehydration under gas-flowing, heat-dehydration under reduced pressure and azeotropic dehydration with an organic solvent. The heating temperature is usually at least 100° C., preferably at least 150° C., so as to substantially remove interlaminar water, and it is not preferable to employ such a high temperature as to destroy the structure. Also, such a heat-dehydration method as to form a crosslinking structure, such as heating in an air stream, is not preferable since the polymerization activity of the catalyst will thereby be lowered. The heating time is at least 0.5 hour, preferably at least 1 hour. As mentioned above, the water content is preferably not higher than 3% by weight, more preferably not higher than 1% by weight, as measured on the basis of the assumption that the water content after dehydrating at 200° C. under a pressure of 1 mmHg for 2 hours is 0% by weight. The lower limit is preferably at least 0% by weight. It is necessary to handle the dehydrated component (B) having a water content of not higher than 3% by weight so as to maintain the water content at the same level when it is contacted with the component (A) and optionally with the component (C).

Examples of an organic aluminum compound optionally used as the component (C) include a compound of the formula:

(wherein $R^8$ is a $C_{1-20}$ hydrocarbon group, X is hydrogen, halogen or an alkoxy ($C_{1-10}$) group, and j is a number of $0<j\leq3$), e.g. a trialkylaluminum such as trimethylaluminum, triethylaluminum, tripropylaluminum or triisobutylaluminum, and a halogen- or alkoxy-containing alkylaluminum such as diethylaluminum monochloride or diethylaluminum methoxide. In addition to these compounds, an aluminoxane such as methylaluminoxane can also be used. Among these compounds, a trialkylaluminum is particularly preferred.

A catalyst is preferably prepared by preliminarily contacting ethylene to the component (A) and the component (B), and optionally the component (C). The contacting order of the respective components of the catalyst is not particularly limited. They may, for example, be contacted in the following orders:

① Components (A) and (B) are contacted.

② Components (A) and (B) are contacted, and then component (C) is added.

③ Components (A) and (C) are contacted, and then component (B) is added.

④ Components (B) and (C) are contacted, and then component (A) is added.

Otherwise, the three components may simultaneously be contacted.

During or after contacting the respective catalyst components, a polymer such as polyethylene or polypropylene, or a solid of an inorganic oxide such as silica or alumina, may be present or contacted.

The contacting may be conducted in an inert gas such as nitrogen or in an inert hydrocarbon solvent such as pentane, hexane, heptane, toluene and xylene. The contacting temperature is from −20° C. to a boiling point of a solvent, preferably from room temperature to a boiling point of a solvent.

With regard to the amounts of the respective catalyst components, the amount of the component (A) is from 0.0001 to 10 mmol, preferably from 0.001 to 5 mmol, per g of the component (B) and the amount of the component (C) is from 0.01 to 10000 mmol, preferably from 0.1 to 100 mmol, per g of the component (B). Also, the atomic ratio of a transition metal in the component (A)/aluminum in the component (C) is 1/0.01 to 1000000, preferably 1/0.1 to 100000.

The preliminary polymerization with ethylene is preferably carried out by supplying etylene under contact of the above respective components in an inert solvent, so as to produce from 0.01 to 1000 g, preferably from 0.1 to 100 g, of a polymer per g of the solid catalyst. The preliminary polymerization temperature is usually from −50 to 100° C., preferably from 0 to 100° C., and the preliminary polymerization time is usually from 0.1 to 100 hours, preferably from 0.1 to 20 hours.

The solid catalyst thus obtained may be used for the polymerization reaction as it is without washing, or may be used after washing. In a case where the treatment is carried out in a solvent such as an inert hydrocarbon, the resulting slurry may be used as it is, or the solvent may be distilled off to use the catalyst in a powder form.

The above described catalyst may be used, if necessary, in combination with an organic aluminum compound, to produce the copolymer of the present invention. The organic aluminum compound to be used here, may be the same compound as the above described component (C). The amount of the organic aluminum compound to be used here, is selected so that the molar ratio of aluminum in the organic aluminum compound to the transition metal in the catalyst component (A) will be from 1:0 to 1:10000.

The ethylene-α-olefin copolymer of the present invention is obtained by copolymerizing ethylene with a $C_{3-20}$, preferably $C_{3-8}$, linear α-olefin such as propylene, 1-butene, 1-hexene, 1-octene, 1-decene, 3-methylbutene-1 or 4-methylpentene-1. Although not particularly limited, the proportion of the α-olefin is preferably from 0.5 to 20%, whereby the above conditions (a) to (c) of the present invention can readily be satisfied.

The polymerization reaction is conducted in the presence or absence of a solvent such as a liquefied α-olefin or an inert hydrocarbon such as butane, pentane, hexane, heptane, toluene or cyclohexane. The temperature is usually within a range of from −50° C. to +250° C. The pressure is not particularly limited, but is preferably within a range of from atmospheric pressure to about 2,000 kgf/cm². Further, hydrogen as a molecular weight controlling agent may be present in the polymerization system.

Now, the present invention will be described in further detail with reference to Examples. However, it should be understood that the present invention is by no means restricted by such specific Examples.

All of the following catalyst preparation steps and polymerization steps were conducted under an atmosphere of purified nitrogen. Further, the solvent used was one dehydrated and purified by means of molecular sieve 4A.

EXAMPLE A-1
(1) Chemical Treatment of Clay Mineral 1 kg of synthetic mica (ME-100, manufactured by Corp Chemical Co., Ltd.) was dispersed in 3.2 kg of desalinated water having 0.2 kg of zinc sulfate dissolved therein, and stirred at room temperature for one hour, followed by filtration. After washing with desalinated water, the solid content was adjusted to a concentration of 25%, and the slurry thus obtained was introduced into a spray drier to obtain spherical granulated particles. The particles were further dried under reduced pressure at 200° C. for two hours.

(2) Preparation of Catalyst

Into a reactor having a capacity of 10 l and equipped with an induction stirrer, 4.4 l of n-heptane and 150 g of the particles of the synthetic mica obtained in the above step (1), were introduced. A solution having 12.0 mmol of dimethylsilylenebis(4,5,6,7-tetrahydroindenyl) zirconium dichloride dissolved in 600 ml of toluene, was added thereto, followed by stirring at room temperature for 10 minutes.

(3) Preliminary Polymerization

To the above stirred mixture, 71.5 mmol of triethylaluminum was then added, and the temperature of the system was adjusted to 60° C. Ten minutes later, ethylene gas was introduced, and the reaction was continued for two hours. Polyethylene formed during this period was 549 g.

(4) Copolymerization of ethylene-1-butene (Slurry Polymerization)

Into a 3 l of autoclave, 1.5 l of n-heptane, 2.5 mmol of triethylaluminum and 100 ml of 1-butene were introduced, and the temperature was raised to 65° C. Then, the preliminarily polymerized catalyst obtained in step (3), was introduced in an amount of 100 mg as the mica component, together with ethylene, and while supplying a gas mixture of ethylene and 1-butene (1-butene based on the weight of ethylene=7.0 wt %) depending upon the consumption of ethylene, polymerization was carried out at 65° C. for two hours while maintaining the total pressure at a level of 22 kg/cm$^2$G. After the two hours, ethanol was added to terminate the polymerization. The obtained ethylene-1-butene copolymer was 228 g. The basic physical properties of the obtained polymer and the results of the cross fractionation measurement are shown in Table 1.

(5) Film Extrusion

The obtained ethylene-1-butene copolymer was subjected to blown-film extrusion to obtain a film having a thickness of 30 μm. The extrusion was carried out by means of a 20 mmφ twin screw extruder at a temperature of 180° C. with a die of 25 mm in diameter with a lip width of 3 mm, with an extruded amount of 18 g at a blow-up ratio of 2.0. The obtained film had a haze of 3.1% and thus had high transparency corresponding to the density.

The haze was measured in accordance with JIS K-7105.

EXAMPLE A-2

Gas phase polymerization was carried out by using the preliminarily polymerized catalyst obtained in Example A-1 (3). Namely, 446 mg/hr of the above solid catalyst and 1700 mg/hr of triethylaluminum were intermittently supplied to a continuous system gas phase polymerization reactor wherein a gas mixture of ethylene and 1-butene (1-butene/ethylene=3.0%) was circulated. The polymerization reaction conditions were 88° C., a pressure of 20 kg/cm$^2$G and an average residence time of 6.9 hours, and the average polymerization rate of formed polyethylene was 8.7 kg/hr. The basic physical properties of the obtained polymer, the results of the cross fractionation measurement and the haze of the film are shown in Table 1.

EXAMPLE A-3
(1) Chemical Treatment of Clay Mineral 22.6 kg of commercially available montmorillonite (Kunipia F manufactured by Kunimine Kogyo K. K.) was dissolved in an acidic aqueous solution having 15 kg of 35% hydrochloric acid added to 6.3 l of desalinated water, and stirred at 90° C. for two hours. This solid component was washed with desalinated water, and then this aqueous slurry of montmorillonite was adjusted to a solid content concentration of 10%, followed by spray granulation by means of a spray drier to obtain spherical particles.

(2) Preparation of Catalyst

Into a reactor having a capacity of 10 l and equipped with an induction stirrer, 625 ml of toluene and 10 g of the particles of montmorillonite obtained in the above step (1) were introduced. While maintaining the temperature at 25° C., a mixed solution comprising 450 mmol of triethylaluminum and 343 ml of toluene was added thereto in its entire amount, followed by stirring for one hour. The supernatant was withdrawn, and the remaining solid component was washed with toluene. Then, n-heptane was added thereto to bring the total amount to 4.4 l. Then, a solution having 12.0 mmol of dimethylsilylenebis(4,5,6,7-tetrahydroindenyl) zirconium dichloride dissolved in 600 ml of toluene, was added thereto at 25° C., followed by stirring for 60 minutes.

(3) Preliminary Polymerization

To the above stirred mixture, 33.0 mmol of triethylaluminum was then added, and the temperature of the system was adjusted to 80° C. Ten minutes later, ethylene gas was introduced, and the reaction was continued for 2.5 hours. Polyethylene formed during this period was 365 g.

(4) Ethylene-1-butene Copolymer and Film Extrusion

Ethylene-1-butene gas phase polymerization and film extrusion were carried out in the same manner as in Example A-2 except that the preliminarily polymerized catalyst obtained in the above step (3) was used. However, 1340 mg/hr of the solid catalyst and the 860 mg/hr of triethylaluminum were intermittently supplied. The polymerization reaction conditions were 88° C., a pressure of 20 kg/cm$^2$G and an average residence time of 7.0 hours, and the average polymerization rate of formed polyethylene was 8.6 kg/hr. The basic physical properties of the obtained polymer, the results of the cross fractionation measurement and the phase of the film are shown in Table 1.

EXAMPLE A-4
(1) Chemical Treatment of Clay Mineral 1 kg of synthetic mica (ME-100, manufactured by Corp Chemical Co., Ltd.) was dissolved in 3.4 kg of desalinated water having 0.80 kg of chromium (III) nitrate dissolved therein, and stirred at room temperature for two hours, followed by filtration. After washing with desalinated water, the solid content was adjusted to a concentration of 25%, and the slurry thus obtained was introduced into a spray drier to obtain spherical granulated particles. The particles were further dried under reduced pressure at 200° C. for two hours.

(2) Preparation of Catalyst

Into a reactor having a capacity of 10 l and equipped with an induction stirrer, 4.4 l of n-heptane and 150 g of the particles of synthetic mica obtained in the above step (1), were introduced. Then, a solution having 12.0 mmol of bis(n-butylcyclopentadienyl)zirconium dichloride dissolved in 600 ml of toluene, was added thereto, followed by stirring at room temperature for 10 minutes.

(3) Preliminary Polymerization

To the above stirred mixture, 71.5 mmol of triethylaluminum was then added, and the temperature of the system was adjusted to 60° C. Ten minutes later, ethylene gas was introduced, and the reaction was continued for two hours. Polyethylene formed during this period was 592 g.

(4) Ethylene-1-butene Copolymer and Film Extrusion

Ethylene-1-butene gas phase polymerization and film extrusion were carried out in the same manner as in Example A-2 except that the preliminarily polymerized catalyst obtained in the above step (3) was used. Namely, 363 mg/hr of the solid catalyst and 568 mg/hr of triethylaluminum were intermittently supplied to a continuous system gas phase polymerization reactor in which a gas mixture of ethylene and 1-butene (1-butene/ethylene=6.4%) was circulated. The polymerization reaction conditions were 83° C., a pressure of 20 kg/cm$^2$G and an average residence time of 14 hours, and the average polymerization rate of formed polyethylene was 4.3 kg/hr. The basic physical properties of the obtained polymer, the results of the cross fractionation measurement and the haze of the film are shown in Table 1.

EXAMPLE A-5

(1) Preparation of Catalyst and Preliminary Polymerization

Into a reactor having a capacity of 1.5 l and equipped with an induction stirrer, 800 ml of n-heptane and 24 g of the particles of synthetic mica obtained in Example A-4(1) were introduced. A solution having 1.92 mmol of bis(n-butylcyclopentadienyl)zirconium dichloride dissolved in 96 ml of toluene, was added thereto, followed by stirring at room temperature for 10 minutes. Then, 11.5 mmol of triethylaluminum was added thereto, and the temperature of the system was adjusted to 60° C. Ten minutes later, ethylene gas was introduced, and the reaction was continued for two hours. Polyethylene formed during this period was 54.7 g.

(2) Ethylene-1-butene Copolymer and Film Extrusion

Slurry polymerization was carried out by using the preliminarily polymerized catalyst obtained in step (1). Namely, into a 3 l autoclave, 1.5 l of n-heptane, 2.5 mmol of triethylaluminum and 200 ml of 1-butene were added, and the temperature was raised to 65° C. Then, the above catalyst was introduced in an amount of 100 mg as the mica component together with ethylene, and polymerization was carried out at 65° C. for two hours while maintaining the total pressure at a level of 22 kg/cm$^2$G. Two hours later, ethanol was added to terminate the polymerization. The obtained ethylene-1-butene copolymer was 285 g. The basic physical properties of the obtained polymer, the results of the cross fractionation measurement and the haze of the film are shown in Table 1.

EXAMPLE A-6

The operation was carried out in the same manner as in Example A-5(1) and (2) except that bis(n-butylcyclopentadienyl)zirconium dichloride was changed to biscyclopentadienyl zirconium dichloride. Polyethylene formed during the preliminary polymerization was 91.7 g. The copolymer obtained by the ethylene-1-butene copolymerization was 230 g. The basic physical properties of the obtained polymer, the results of the cross fractionation measurement and the haze of the film are shown in Table 1.

EXAMPLE A-7

The preliminarily polymerized catalyst was produced in the same manner as in Example A-5(1) except that bis(n-butylcyclopentadienyl)zirconium dichloride was changed to dimethylsilylenebis(4,5,6,7-tetrahydroindenyl)zirconium dichloride, and ethylene-1-butene copolymerization and film extrusion were carried out in the same manner as in Example A-1(4) and (5). Polyethylene formed during the preliminary polymerization was 93.6 g. The copolymer obtained by the ethylene-1-butene copolymerization was 298 g. The basic physical properties of the obtained polymer, the results of the cross fractionation measurement and the haze of the film are shown in Table 1.

COMPARATIVE EXAMPLE A-1

EXACT3030 manufactured by Exxon Chemical Co., Ltd., which is a commercially available polymer product obtained by a metallocene catalyst, was subjected to film extrusion under the same condition as in Example A-1(5). The haze of the film was 5.5 and thus had low transparency corresponding to the density. The basic physical properties of the product and the results of the cross fractionation measurement are shown in Table 1.

COMPARATIVE EXAMPLE A-2

Affinity FM1570 manufactured by Dow Chemical Co., Ltd., which is a commercially available polymer product produced by a metallocene catalyst, was subjected to film extrusion under the same condition as in Example A-1(5). The film had a haze of 7.0 and thus had low transparency corresponding to the density. The basic physical properties of the product and the result of the cross fractionation measurement are shown in Table 1.

COMPARATIVE EXAMPLE A-3

UF240 manufactured by Mitsubishi Chemical Co., Ltd., which is a commercially available polymer product produced by a Zieglar catalyst, was subjected to film extrusion under the same condition as in Example A-1(5). The film had a haze of 20.1 and thus had very low transparency corresponding to the density. The basic physical properties of the product and the results of the cross fractionation measurement are shown in Table 1.

TABLE 1

| | Characteristics of copolymer | | | | | | | | | | |
|---|---|---|---|---|---|---|---|---|---|---|---|
| | | Condition (b) | | | Condition (c) | | | | | Condition (d) | |
| | Condition (a) Density (g/cm$^3$) | MT | MFR (g/10 min) | Claimed formula (1) | Tmax (° C.) | $W_{60}$ (wt %) | $W_{90}$ (wt %) | Claimed formula (2) | Claimed formula (3) | Claimed formula (4) | Claimed formula (5) | Evaluation Haze (%) |
| Example A-1 | 0.9180 | 1.33 | 1.82 | ◯ | 73.0 | 0.3 | 1.6 | ◯ | ◯ | ◯ | ◯ | 3.1 |
| Example A-2 | 0.9180 | 0.74 | 1.90 | ◯ | 74.2 | 3.3 | 1.8 | ◯ | ◯ | ◯ | ◯ | 5.0 |

TABLE 1-continued

| | Condition (a) Density (g/cm³) | Condition (b) | | | Condition (c) | | | | | | Condition (d) | Evaluation Haze (%) |
|---|---|---|---|---|---|---|---|---|---|---|---|---|
| | | MT | MFR (g/10 min) | Claimed formula (1) | Tmax (° C.) | W₆₀ (wt %) | W₉₀ (wt %) | Claimed formula (2) | Claimed formula (3) | Claimed formula (4) | Claimed formula (5) | |
| Example A-3 | 0.9210 | 1.07 | 2.03 | ○ | 74.4 | 1.9 | 5.4 | ○ | ○ | ○ | ○ | 3.3 |
| Example A-4 | 0.9200 | 2.17 | 1.09 | ○ | 77.1 | 0.24 | 4.2 | ○ | ○ | ○ | ○ | 3.5 |
| Example A-5 | 0.9236 | 1.65 | 4.69 | ○ | 75.5 | 0.3 | 5.8 | ○ | ○ | ○ | ○ | 5.1 |
| Example A-6 | 0.9211 | 4.25 | 1.73 | ○ | 73.9 | 1.8 | 3.0 | ○ | ○ | ○ | ○ | 3.0 |
| Example A-7 | 0.9233 | 4.26 | 1.42 | ○ | 74.4 | 2.7 | 6.9 | ○ | ○ | ○ | ○ | 3.0 |
| Comparative Example A-1 | 0.9100 | 0.27 | 2.13 | × | 68.8 | 14 | 0 | ○ | ○ | × | × | 5.5 |
| Comparative Example A-2 | 0.9160 | 2.83 | 1.04 | ○ | 76.6 | 5.6 | 0 | ○ | × | × | × | 8.0 |
| Comparative Example A-3 | 0.9200 | 0.76 | 1.95 | ○ | 91.8 | 24.1 | 15.6 | × | × | ○ | × | 20.1 |

In the above Table, symbol ○ means that the formula concerned was satisfied, and symbol × means that the formula concerned was not satisfied.

The following catalyst preparation steps and polymerization steps were all carried out in a purified nitrogen atmosphere. Further, the solvent used was one dehydrated and purified by means of molecular sieve 13X.

EXAMPLE B-1

(1) Chemical Treatment of Clay Mineral 1 kg of synthetic mica (ME-100, manufactured by Corp Chemical Co., Ltd.) was dispersed in 3.4 kg of desalinated water having 0.60 kg of chromium (III) nitrate dissolved therein, and stirred at 50° C. for one hour, followed by filtration. After washing with desalinated water, the solid component was adjusted to a concentration of 20%, and the slurry thus obtained was subjected to spray granulation to obtain spherical particles. The particles were further dried under reduced pressure at 200° C. for two hours.

(2) Preparation of Catalyst

Into a reactor having a capacity of 10 l and equipped with an induction stirrer, 5.4 l of n-heptane and 50 g of the particles of synthetic mica obtained in the above step (1), were introduced. Then, a solution having 4.0 mmol of bis(n-butylcyclopentadienyl)zirconium dichloride dissolved in 600 ml of toluene, was added thereto, followed by stirring at room temperature for 10 minutes.

(3) Preliminary Polymerization

To the above stirred mixture, 23.6 mmol of triethylaluminum was then added, and the temperature of the system was adjusted to 60° C. Ten minutes later, ethylene gas was introduced, and the reaction was continued for 3 hours. Polyethylene formed during this period was 819 g.

(4) Ethylene-1-butene Copolymerization (Gas Phase Polymerization)

233 mg/hr of the above solid catalyst and 510 mg/hr of triethylaluminum were intermittently supplied to a continuous system gas phase polymerization reactor in which a gas mixture of ethylene and 1-butene (1-butene/ethylene=4.4 mol %) was circulated. The polymerization reaction conditions were 83° C., an ethylene pressure of 18 kg/cm²G and an average residence time of 10.7 hours, and the average polymerization rate of formed polyethylene was 5.6 kg/hr. The basic physical properties of the obtained polymer, the results of the cross fractionation measurement and the haze of the film are shown in Table 2.

(5) Film Extrusion

The obtained ethylene-1-butene copolymer was subjected to blown-film extrusion to obtain a film having a thickness of 30 μm. The extrusion was carried out by means of a 40 mmφ single screw extruder at a temperature of 180° C. by a die of 75 mm in diameter, with a lip width of 3 mm with an extruded amount of 14 kg at a blow-up ratio of 2.0. The obtained film had a haze of 4.6% and thus had high transparency corresponding to the density.

The haze was measured in accordance with JIS K-7105, and the melt tension (MT) was measured by means of a capilograph manufactured by Kabushiki Kaisha Toyo Seiki Seisakusho under such conditions that the nozzle diameter was 2.095 mm, the nozzle length was 8 mm, the flow-in angle was 180°, the temperature was 190° C., the extrusion rate was 1.0 cm/min, the withdrawing rate was 4.0 m/min, and the distance from the die outlet to the lower end of the V-pully of the tension detector was 40 cm.

EXAMPLE B-2

(1) Ethylene-1-butene Copolymerization

Slurry polymerization was carried out by using the preliminarily polymerized catalyst obtained in Example B-1(3). Namely, into a 3 l autoclave, 1.5 l of n-heptane, 2.5 mmol of triethylaluminum and 200 ml of 1-butene were introduced, and the temperature was raised to 65° C. Then, the above preliminarily polymerized catalyst was introduced in an amount of 100 mg as the mica component together with ethylene, and polymerization was carried out at 65° C. for two hours while maintaining the total pressure at a level of 22 kg/cm²G. After the two hours, ethanol was added to terminate the polymerization. The obtained ethylene-1-butene copolymer was 263 g. The basic physical properties of the obtained polymer are shown in Table 2.

(2) Film Extrusion

The obtained ethylene-1-butene copolymer was subjected to blown-film extrusion to obtain a film having a thickness of 30 μm. The extrusion was carried out by means of a 20 mmφ twin screw extruder at a temperature of 180° C. with a die of 25 mm in diameter with a lip width of 3 mm with an extrusion amount of 18 g at a blow-up ratio of 2.0. The obtained film had a haze of 5.1% and thus had high transparency corresponding to the density.

COMPARATIVE EXAMPLE B-2

LF240 manufactured by Mitsubishi Chemical Co., Ltd., which is a commercially available high pressure method low density polyethylene, was subjected to blown-film extrusion under the same conditions as in Example B-1(5). The film had a haze of 8.0% and thus had low transparency corresponding to the density. The basic physical properties of the product are shown in Table 2.

COMPARATIVE EXAMPLE B-3

UE320 manufactured by Mitsubishi Chemical Co., Ltd., which is a commercially available polymer product produced by a chromium type catalyst, was subjected to blown-film extrusion under the same conditions as in Example B-1(5). The film had a haze of 20% and thus had very low transparency corresponding to the density. The basic physical properties of the product are shown in Table 2.

COMPARATIVE EXAMPLE B-1

Affinity PL1840 manufactured by Dow Chemical Co., Ltd., which is a commercially available polymer product produced by a metallocene catalyst, was subjected to film extrusion under the same conditions as in Example B-1(5). The film had a haze of 6.2% and thus had low transparency corresponding to the density. The basic physical properties of the product are shown in Table 2.

(c) the relation between the melt tension (MT) and the melt flow rate (MFR) at 190° C. satisfies the following formula (1):

$$\log(MT) \geq -0.91 \times \log(MFR) + 0.06 \quad (1),$$

(d) the following three formulae (2), (3) and (4) are satisfied:

$$Tmax \leq 972D - 816 \quad (2)$$

$$\log W_{60} \leq -0.114\, Tmax + 9.48 \quad (3)$$

$$\log W_{90} \geq 0.0394\, Tmax - 2.95 \quad (4)$$

where D is the density, Tmax is the elution peak temperature (°C.) by the cross fractionation measurement, $W_{60}$ is the weight percent (wt %) of a soluble content at 60° C. or lower, and $W_{90}$ is the weight percent (wt %) of a soluble content at 90° C. or higher, determined by crossfractionation using o-dichlorobenzene as solvent; and (e) the film haze $$(\%) \leq 1.5 \times 10^4 \times (D-0.9)^2 + 3 \quad (5).$$

TABLE 2

Characteristics of copolymer

| | Condition (a) Density (g/cm³) | Condition (b) | | | Condition (c) | | | | | | Condition (d) | Evaluation |
|---|---|---|---|---|---|---|---|---|---|---|---|---|
| | | MT | MFR (g/10 min) | Claimed formula (1) | Tmax (° C.) | $W_{60}$ (wt %) | $W_{90}$ (wt %) | Claimed formula (2) | Claimed formula (3) | Claimed formula (4) | Claimed formula (5) | Haze (%) |
| Example B-1 | 0.9303 | 1.76 | 1.29 | ○ | 83.2 | 0 | 22.5 | ○ | ○ | ○ | ○ | 6.2 |
| Example B-2 | 0.9210 | 2.59 | 1.20 | ○ | 73.3 | 0.7 | 5.0 | ○ | ○ | ○ | ○ | 4.5 |
| Comparative Example B-1 | 0.9110 | 3.28 | 1.05 | ○ | 71.5 | 9.7 | 0 | ○ | ○ | X | X | 6.2 |
| Comparative Example B-2 | 0.9224 | 10.8 | 0.72 | ○ | 76.9 | 8.8 | 0 | ○ | X | X | ○ | 8.0 |
| Comparative Example B-3 | 0.9250 | 5.9 | 0.89 | ○ | 76.7 | 20.7 | 4.5 | ○ | X | ○ | X | 32 |

The ethylene-α-olefin copolymer of the present invention has a high melt tension and is excellent in a film extrusion property, whereby it is possible to produce a film excellent in transparency, gloss and drape.

What is claimed is:

1. An ethylene-α-olefin copolymer which is a copolymer of ethylene with a $C_{3-20}$ α-olefin, said copolymer satisfying the following conditions (a) to (e):

(a) the density (D) is from 0.850 to 0.950 g/cm³, (b) the melt flow rate (MFR) value as measured at 190° C. under a load of 2.16 kg in accordance with ASTMD 1238 is in the range of from 0.1 to 50 g/10 min., 2. The ethylene-α-olefin copolymer according to claim 1, wherein said condition (d) is such that the three formulae (2)', (3) and (4)' are satisfied:

$$Tmax \leq 972D - 816 \quad (2)'$$

$$\log W_{60} \leq -0.114\, Tmax + 9.48 \quad (3)$$

$$\log W_{90} \geq 0.0394\, Tmax - 2.81 \quad (4)'$$

3. The ethylene-α-olefin copolymer according to claim 1, wherein the density of said condition (a) is from 0.850 to 0.935 g/cm³.

* * * * *